J. G. P. THOMAS.
ELECTRIC STARTING AND IGNITION SYSTEM.
APPLICATION FILED JAN. 4, 1919.
1,313,574.
Patented Aug. 19, 1919.
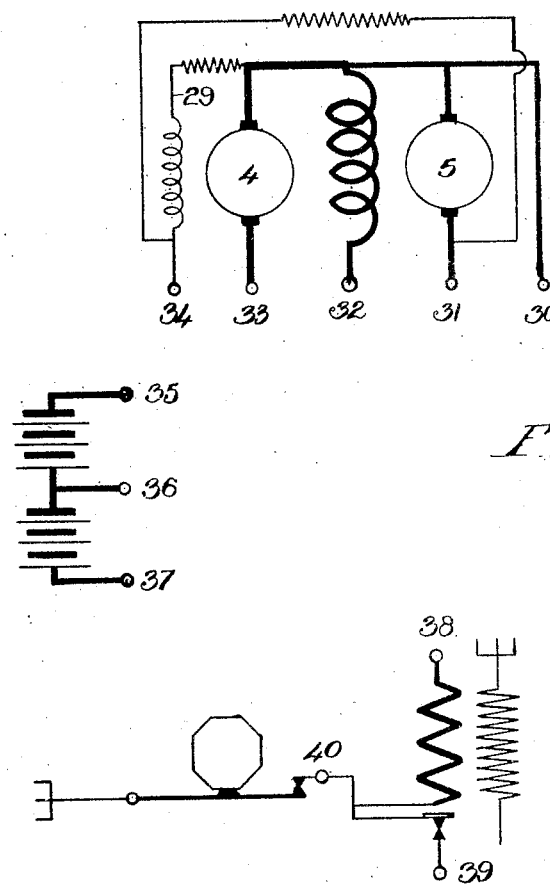
Fig:4
INVENTOR.
John Godfrey Parry Thomas
per Arthur J. Stephens
Attorney.

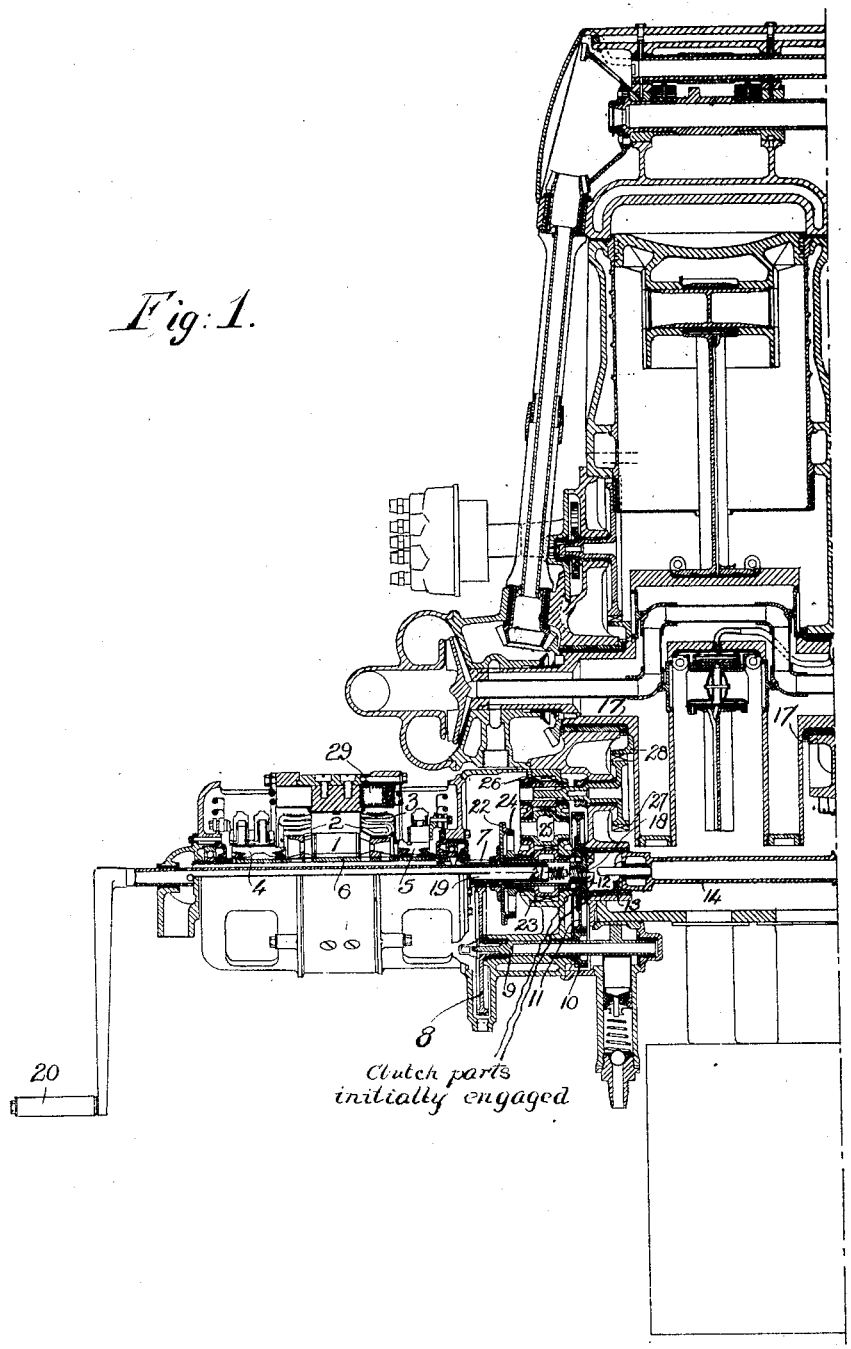

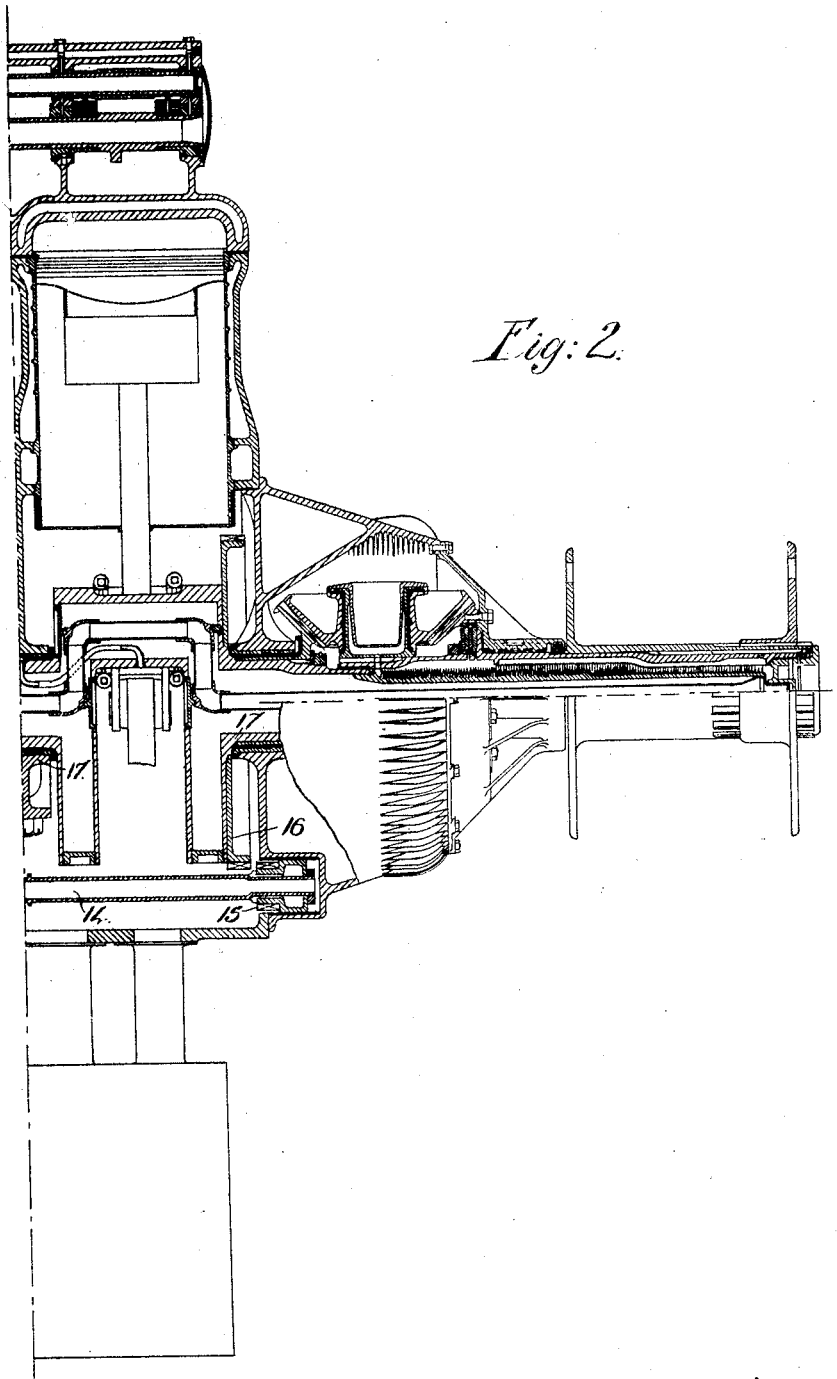

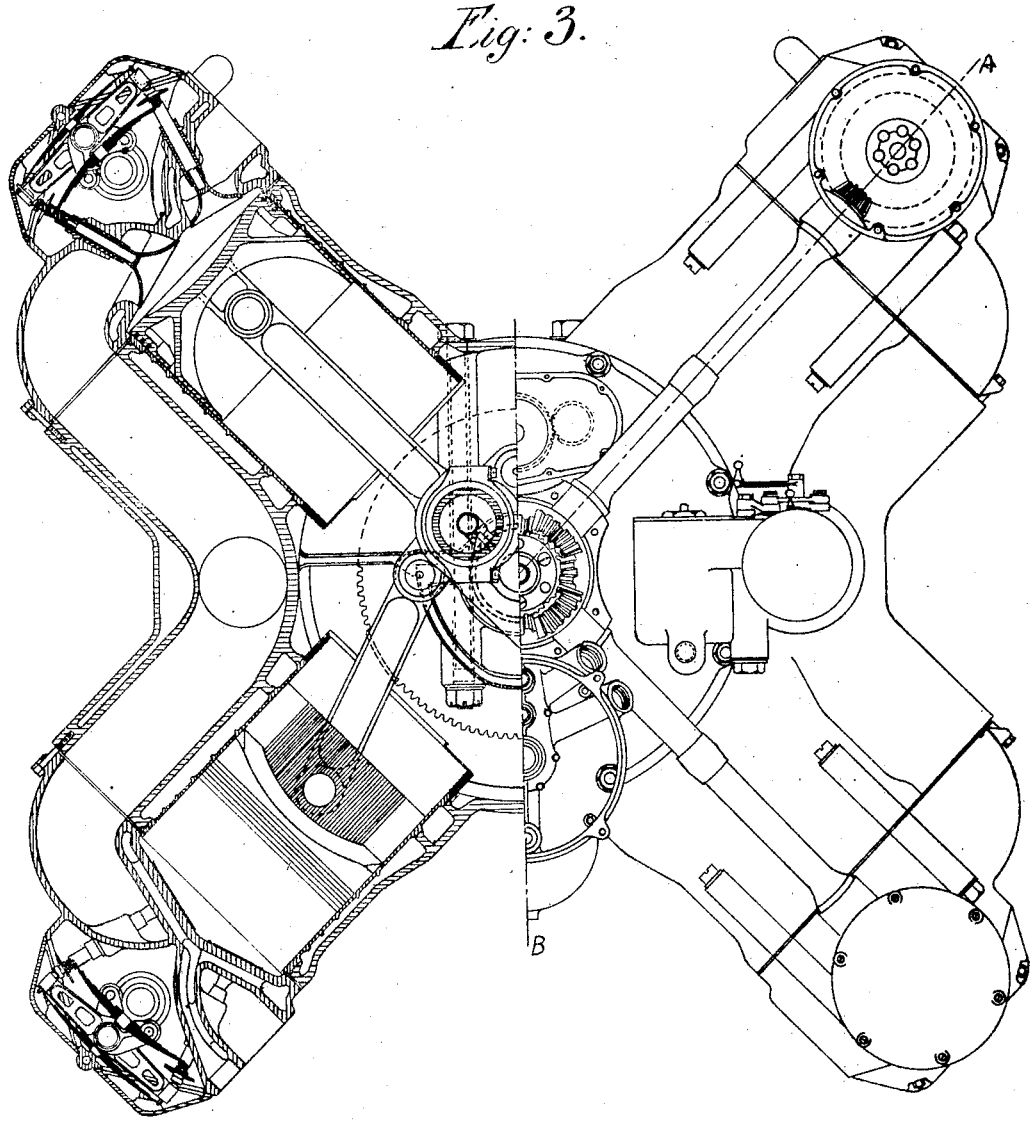

UNITED STATES PATENT OFFICE.

JOHN GODFREY PARRY THOMAS, OF BARNES, LONDON, ENGLAND, ASSIGNOR TO LEYLAND MOTORS (1914) LTD., OF LEYLAND, ENGLAND.

ELECTRIC STARTING AND IGNITION SYSTEM.

1,313,574.  Specification of Letters Patent.  Patented Aug. 19, 1919.

Application filed January 4, 1919. Serial No. 269,653.

*To all whom it may concern:*

Be it known that I, JOHN GODFREY PARRY THOMAS, a subject of the King of Great Britain and Ireland, residing at Caversham Lodge, Vine Road, Barnes, in the county of London, England, have invented certain new and useful Improvements in Electric Starting and Ignition Systems, of which the following is a specification.

The object of the present invention is to simplify the starting of internal combustion engines and to avoid the use of a separate starting magneto. Broadly contemplated, the present invention consists in arranging the dynamo electric machine which usually runs as a starting motor and as a generator for charging the batteries, to also be driven by hand, in case of necessity, at a speed greatly in excess of that of the engine shaft and either accompanied by or independently of rotation of engine shaft, to generate the ignition current on starting. It is convenient for the machine to run as a motor at a higher speed than that at which it is driven as a generator. Consequently, the machine is furnished with two windings, the generator winding having a larger number of turns than the motor winding. As a practical example, the generator or high tension winding may have three times as many turns as the motor or low tension winding. The field may as usual have a series winding of few turns and a shunt winding, and the dynamo electric machine is provided with a suitable gearing to enable it to run at correct speeds both as a generator and as a motor.

An example of starting gear in accordance with this invention is illustrated in the accompanying drawings, in which:—

Figure 1 is the left hand side of a partial sectional elevation on the line A—B of Fig. 3 of an engine showing the starting dynamo electric machine and the gearing connecting it to the engine crankshaft;

Fig. 2 is the right hand side of the partial sectional elevation of the engine shown in Fig. 1;

Fig. 3 is a partial sectional end elevation of the engine shown in Figs. 1 and 2, and Fig. 4 is a diagram of electrical connections.

In these drawings, the armature of the starting dynamo electric generator is seen at 1 and carries the inner low-tension or motor winding 2 and the outer high tension or generator winding 3. The winding 2 is connected to the left-hand commutator 4 and the winding 3 to the commutator 5. The shaft 6 of the dynamo is hollow and, at its inner end, carries a small pinion 7 engaging with a spur wheel 8. The shaft 9 to which the wheel 8 is secured also carries a pinion 10 engaging a further spur wheel 11 co-axial with the pinion 7 and dynamo shaft 6. The wheel 11 is fixed to a member carrying dog teeth of a clutch 12. The teeth 13 of a further clutch can be caused to engage the clutch 12 but these teeth are furnished with inclined faces so that in some circumstances which will be dealt with below these teeth co-act with the result that the teeth 13 are pushed to the right free of the clutch 12 into the position shown in Fig. 1. With the teeth 13, the hollow shaft 14 carrying these teeth moves to the right as does also the pinion 15 on the shaft 14. Normally, however, in the left hand position the pinion 15 engages with a spur wheel 16 secured upon the engine crankshaft 17. Thus when the dynamo electric machine runs as a motor supplied from the battery, it can rotate the crankshaft 17 for starting purposes through the gearing 7, 8, 9, 10, 11, 12, 13, 14, 15 and 16. The reduction ratio of this gearing can be anything required preferably 100—150 to 1. When the engine fires and tends to drive the electric motor, the sloping faces of the clutch teeth 12, 13 co-act and automatically come out of engagement.

In case the battery is out of action, it is desirable to be able to rotate the crankshaft 17 by hand. For this purpose the clutch 12 is bored centrally and this bore is screw-threaded as seen at 18. As already mentioned the clutch 12 is co-axial with the hollow dynamo-shaft 6. A spindle 19 passes through this latter and is adapted to be rotated by the starting handle 20. The inner end of the spindle 19 is screw-threaded at 21 and by this means is adapted to be connected to and to rotate the spur wheel 11 and clutch 12.

Then the crankshaft 17 can be cranked from handle 20 through members 19, 21, 18, 12, 13, 14, 15 and 16.

The dynamo electric machine can also be rotated as a generator from the crankshaft 17 for charging the battery and for ignition owing to the following arrangements. The pinion 7 has secured to it a member 22 which is adapted to be driven by a further spur wheel 23 through a free-wheel or centrifugal clutch 24 when the wheel 23 is rotating in one direction relatively to the dynamo shaft 6. The gear wheel 23 is connected to the crankshaft 17 by means of spur wheels 25, 26, 27, 28. The clutch 24 is so arranged that when the engine is started, it is capable of driving the dynamo shaft 6 through the gearing 28, 27, 26, 25, 23, 24, 22 and 7 in the same direction as it rotates when running as a motor.

When the clutch 12, 13 is out of engagement if the handle 20 is rotated it locks itself by means of the screw thread 18, 21, and then rotates the spur wheel 11 but not the shaft 14 as above described. In this case the armature 1 only is rotated at a speed much greater than that of the handle 20. The actual speed depends upon the diameters of the wheel 11, 10, 8 and 7 but for convenience these may be such that the armature 1 turns at from 10 to 20 times the speed of the handle 20. It will be noticed that although the gearing between the crankshaft and the starting handle 20 is interrupted as soon as the engine fires, the co-action of the clutch members 12, 13 causing the cutting off of the crankshaft from manual rotation, nevertheless the interconnection between the starting handle and the dynamo electric machine is not immediately interrupted; it is not until the engine has accelerated sufficiently to drive the dynamo electric machine at a speed greater than that of its manual rotation, that the screwed part 18 of the clutch member 12 is disengaged from the screwed end 21 of the starting handle spindle.

In order that the machine may excite under normal conditions the shunt field winding 29 is designed to be excited by the low tension armature winding 2 and the battery to be charged from the high tension armature winding 3. When the armature 1 is rotated by hand under the conditions last discussed, however, the high tension winding 3 is connected to the shunt field winding 29 the battery being out of action with the result that the machine excites at one third the speed it will when driven by the engine. The brushes of the high tension commutators 5 are connected for ignition purposes to the primary winding of a spark coil with a trembler break furnished with an engine driven high tension distributer in the usual way.

In starting the engine by hand, the engine is first primed by rotating the crankshaft 17 by hand with the clutch 12, 13 engaged. This is then disengaged and electrical connection is made to the distributer and the armature 1 rotated by hand until the machine excites when the engine should fire and start up. Immediately the engine starts overrunning it causes the spindle 19 and the member 12 to become unscrewed in order to free the handle 20 and the armature 1 is then driven through clutch 24. At this stage, the primary winding of the spark coil and the shunt field winding 29 are connected to the brushes on the low-tension commutator 4 and, if the battery requires charging, it is joined to the brushes on commutator 5.

In order to have the control as simple as possible, it is proposed to make the various connections between the battery, dynamo and ignition coils for the different operations through a small controller switch, tramway type, of known construction. The said connections will be better understood by reference to the accompanying Fig. 4, in which the dynamo electric machine is indicated as having five terminals for connection to the controller, namely terminal 30 (to the common junction of the field windings and one brush of each commutator), 31 (to the other brush of the high tension commutator), 32, (to the field series winding), 33, (to the other brush of the low tension commutator), and 34 (to the field shunt winding). In the same figure is indicated also the battery, shown as consisting of two sets of three cells each, connected to a negative terminal 35, to a positive terminal 37, and to an intermediate terminal 36; and there is indicated thirdly the spark coil with trembler interrupter in which for connection to the controller one end of the primary winding goes to the terminal 38, the other end to the trembler interrupter and on to terminal 39, and also to terminal 40. Terminal 39 is connected to earth terminal through the controller, and the terminal 40 is connected to contact breaker and on to earth. The secondary winding has of course one end earthed and the other connected to distributer.

In designing the controller interior contact mechanism of the usual type to make desired interconnections between the several contacts above mentioned, one method in keeping with the invention would be to arrange for seven positions of the controller handle, the respective interconnections effected in these positions being as follows. For starting the engine in normal fashion by motoring the dynamo electric machine, ignition being then by trembler coil, let the handle, in position one, make the connection 32—37, 33—35—38, and 30 and 39 to earth (40 being already connected through contact breaker to earth); the contact breaker is retarded and operates as an interrupter, so that the spark coil operates as a trembler coil when contacts are open, and ceases when contacts are closed. In case the battery should be found incapacitated, the controller handle can be moved into the second position in which all electrical connections are broken and ignition suspended while the engine is primed by manual operation. In the third position of the handle, the dynamo electric machine being rotated by hand, ignition can be by trembler coil, the controller connecting 31—34—38 and 30 and 39 to earth (40 being already connected through contact breaker to earth). The spark coil operates in first position. The fourth position can provide ignition from the low tension commutator of the engine-driven dynamo electric machine, the connections being 33—34—38, and 30 to earth (40 being already connected through contact breaker to earth). The spark coil operates as a plain coil. To provide for coupling up the battery also to the low tension commutator, (the dynamo electric machine being engine-driven), the fifth position can maintain the connections 33—34—38 and 30 to earth (40 being already connected through contact breaker to earth), and can in addition connect 31—35 and 30—37. The spark coil operates as a plain coil. In the remaining two positions (the dynamo electric machine being still engine driven), connections can allow of ignition from battery; the sixth position can join the coil to battery positive pole, making the connections 37—38, 31—35, 36—34 and 30—37, also 36 to earth (40 being already connected through contact breaker to earth, the spark coil operating as a plain coil; and the seventh position can join the coil to the negative pole, connecting 31—35—38, 30—37, 33—34, and 36 and 40 through contact breaker, the spark coil operating as a plain coil.

What I claim is:—

1. In an electric starter system for internal combustion engines in which the usual dynamo machines serves normally as starting motor and battery charging generator, means for manually driving said dynamo, without using it as a starting motor, at a speed greatly in excess of that of the engine shaft during the starting period, and means whereby the dynamo may rotate either accompanied by or independently of rotation of the engine shaft, whereby said dynamo may take the place of an auxiliary ignition magneto for starting purposes.

2. A system as claimed in claim 1, in which the dynamo electric machine is so geared to the starting handle that the dynamo electric machine is on starting rotated by the starting handle at a speed greatly in excess of that of the engine shaft, and means whereby the dynamo may rotate either accompanied by or independently of rotation of the engine shaft until the engine fires, when the starting handle is automatically disconnected from the gearing.

3. A system as claimed in claim 1, in which two sets of gearing connect the shaft of the dynamo electric machine with the engine crank shaft, one being operative for turning the crank shaft to start the engine and the other serving to drive the machine as a generator after the engine has started.

In testimony whereof I sign my name to this specification.

JOHN GODFREY PARRY THOMAS.